United States Patent [19]

Moody et al.

[11] Patent Number: 5,347,567
[45] Date of Patent: Sep. 13, 1994

[54] APPARATUS AND METHOD FOR IDENTIFYING A CALLING STATION

[75] Inventors: Martin Moody, Inver Grove Heights; Gordan Osgood, Starbuck, both of Minn.

[73] Assignee: Telident, Incorporated, Minneapolis, Minn.

[21] Appl. No.: 943,055

[22] Filed: Sep. 10, 1992

[51] Int. Cl.$^5$ .................. H04M 11/00; H04M 11/04
[52] U.S. Cl. ...................................... 379/45; 379/50
[58] Field of Search ............. 379/45, 38, 39, 40, 379/41, 42, 43, 44, 49, 50, 51, 92, 106, 142

[56] References Cited

U.S. PATENT DOCUMENTS

| | | | |
|---|---|---|---|
| 4,064,368 | 12/1977 | Dibner | 379/38 |
| 4,176,254 | 11/1979 | Tuttle et al. | 379/45 |
| 4,237,344 | 12/1980 | Moore | 379/38 |
| 4,450,320 | 5/1984 | Ostermann et al. | 379/45 |
| 4,672,654 | 6/1987 | Vanacore | 379/49 |
| 4,893,325 | 1/1990 | Pankonen et al. | 379/142 |
| 5,077,788 | 12/1991 | Cook et al. | 379/142 |
| 5,109,399 | 4/1992 | Thompson | 379/142 |
| 5,161,180 | 11/1992 | Chavons | 379/234 |

Primary Examiner—Curtis Kuntz
Assistant Examiner—Stella L. Woo
Attorney, Agent, or Firm—Nawrocki, Rooney & Sivertson

[57] ABSTRACT

A system for identifying a specific station, of a plurality of stations serviced by a telephone system, which has initiated a telephone call. The system includes means for providing designation indicia associated with each station within the system. A module at each station includes a control circuit for converting the designation indicia to an electronic format and, at an appropriate time, transmitting the electronically formatted designation indicia to a call-receiving station. In response to a call, the receiving station polls the calling station, and, in response, the calling station transmits the electronically formatted indicia to the call-receiving station.

16 Claims, 1 Drawing Sheet

APPARATUS AND METHOD FOR IDENTIFYING A CALLING STATION

TECHNICAL FIELD

The present invention deals broadly with the field of telecommunications. More specifically, however, it deals with the identification of a specific station of a plurality of stations serviced by a telephone system having initiated a telephone call. The specific focus of the invention is the identification of the precise location having initiated a telephone call, identifying even to the floor of a building at a defined geographic location or the specific desk at which a particular call was initiated.

BACKGROUND OF THE INVENTION

Since the inception of the telephone, that invention and systems in which it is used have been virtually constantly improved. In its earliest days, the telephone was placed at so few locations that the person answering almost knew where a call was coming from before picking up the receiver. With the passage of decades, however, it has come to be that scarcely a home, apartment, or condominium does not have a telephone. In a residential setting, the telephone has certainly come to be a more than a "want". It is now a "need". Because of various factors such as the increased rate of crime and the high incidence of medical emergencies, it is almost imperative that each and every residence have the availability of a telephone.

The situation is even more acute in the business area. As commerce has evolved, more and more transactions are conducted by telephone as compared to a face-to-face manner. It is essential that, for a business to survive, it have telephone services. This is true even in the case of rural-type businesses.

In the relatively recent past, the United States has implemented a "9-1-1" emergency call system. Such systems intend to identify a particular location having initiated an emergency call. The intent is that, if the person initiating the call is emotionally agitated or unable to talk for a long period of time because, for example, of a spreading fire, and does not, as a result, identify the specific station from which he is calling, the public safety answering point (PSAP) to which the call has been routed will still be able to fully respond in an appropriate manner. That is, even if the caller has failed to identify the location from which he is calling, the PSAP should be able to respond with the appropriate police, fire, ambulance, or other type of response necessary.

A number of factors, however, exacerbate the successful operation of the emergency call network. First, because of the fact that, in many scenarios, identification of the calling station is tied to the telephone number, incorrect information can be provided to the PSAP. This is true because of the fluidity of location of both businesses and individuals. As a business, for example, moves, it might well retain its original base telephone number. This is particularly true if the distance moved is relatively small. Particular three-number designators of the seven-digit telephone numbers are typically assigned to particular geographic locations. If the move is within that geographic area, the original number can be retained, and, even when the move is outside the immediate geographic area, the number can still be retained if the move is within the same general locale.

Typically, a PSAP is provided with database information based upon telephone numbers. Consequently, while the database might have correctly identified the resident or business occupant initiating the call prior to a move, if a move has occurred, the appropriate emergency service might be routed to an incorrect location because of a delay in updating the database, for example. Such a consequence could result in the significant loss of property or even one or more deaths.

Further, even if no move has occurred with respect to a calling individual or business for a very long period of time, insufficient information might be available in a database so as to enable adequate routing of services. To illustrate, an emergency call for ambulance services is initiated from an office on the thirty-fourth floor of a high-rise office building in a large urban location. The call is initiated because an individual in the office has stopped breathing. The emergency occurs on a Saturday and only two persons are in the office at the time. One of the two has experienced the breathing difficulty and the second person is initiating the emergency call. While making the call for the ambulance services, the second person is also trying to restore breathing in the person experiencing the trauma.

The nature of the emergency is conveyed to the PSAP, and the caller has indicated the street address at which the office is located. Because of the need to get back to the person experiencing the trauma, the caller has failed to identify where in the high-rise building the person needing the emergency services is located. The PSAP routes ambulance services to the street address only, and the ambulance personnel find that the building is, in fact, a high-rise. By the time the individual is located, it might well be too late to administer efficacious services.

In view of this illustration, one can clearly see the need for the precise identification of the location from which a call is being initiated. The necessity to save lives makes such a need clearly apparent.

Other scenarios, in addition to an emergency "9-1-1" telephone call network, exist wherein it is necessary to identify the specific location from which a telephone call is being made. For example, such a need exists in the case of a roving security guard. A roving security guard, typically, is responsible for a number of geographically-dispersed stations. At each station, the guard has responsibility for personally insuring that certain conditions of security are met.

Such an arrangement can encourage fraudulent reporting on the part of the guard. For example, if ten locations around a large metropolitan area are the responsibility of the guard, he could visit only one or a small number of the total facilities for which he has a responsibility, and call into a central location to report that the required conditions of security are met when, in fact, many of the stations have not been visited. In a worst-case scenario, the guard might even make the calls purporting to be from the various locations, from his residence. Such conduct could be obviated if the central location to which calls were to be placed could definitively identify a call from a roving security guard as emanating from a station at which the security condition is to be checked.

It is to these dictates and problems of the prior art that the present invention is directed. It is an apparatus and method for definitively identifying a specific station initiating an incoming telephone call.

SUMMARY OF THE INVENTION

The present invention includes a method and apparatus for identifying a specific station, of a plurality of stations under a common telephone network, which has initiated a telephone call. The method includes a first step of assigning a designation to each station capable of initiating a telephone call within the system. The designation is then encoded into an electronic format. Means are provided at the calling station for transmitting the encoded designation to a call-receiving office. The call is then sensed by the call-receiving station. The transmitting means is then polled in response to the telephone call. The encoded designation is transmitted to the call-receiving office in response to the polling.

The method invention, as is true of the apparatus invention, has applications in a number of circumstances. The call-receiving office can be a monitoring office to which a roving security guard reports from various diverse geographic locations at which security status is to be checked. There is also an application wherein the call-receiving office is a public safety answering point (PSAP) responsible for a designated geographic area including the calling station.

The apparatus invention includes designation indicia associated with each station which is capable of initiating a telephone call. Means are provided for encoding such designation indicia into an electronic format. Further, the apparatus includes means for transmitting the encoded designation indicia from the calling station to a call-receiving location. Means are provided to sense, at the call-receiving location, the call. Means are provided at the call-receiving location for polling the transmitting means in response to the initiation of the telephone call, and means for transmitting the encoded designation indicia to the call-receiving location in response to the polling are also included.

It is envisioned that the apparatus could also include means for providing power to the transmitting means. In a preferred embodiment, the means for providing power could include structure for availing the system of the benefit of the telephone line power.

The present invention is thus apparatus and a method for definitively identifying the location of a specific calling station such as in a security system or an emergency "9-1-1" call system. More specific features and advantages obtained in view of those features will become apparent with reference to the detailed description of the invention, appended claims, and accompanying drawing figures.

DETAILED DESCRIPTION OF THE INVENTION

Figure 1:
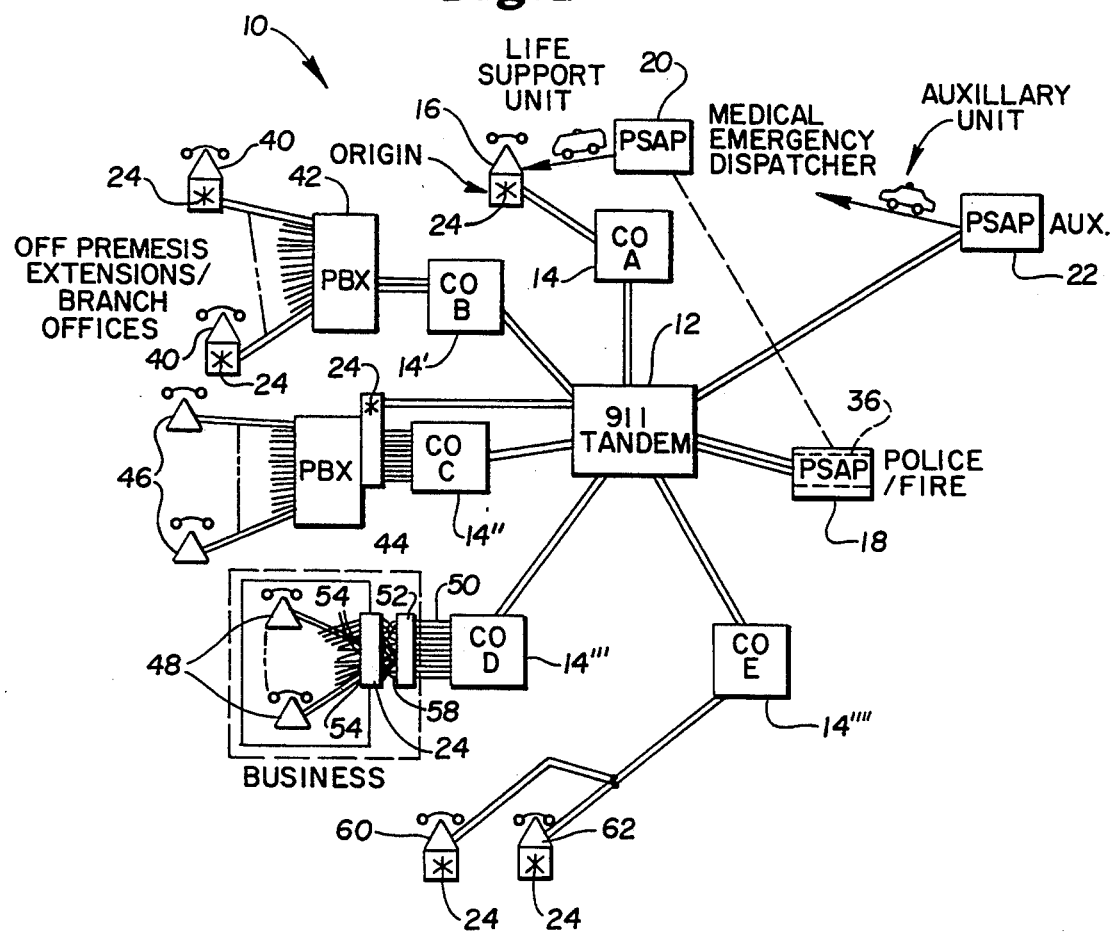
FIG. 1 is a diagrammatic illustration showing various implementations of the present invention in an emergency "9-1-1" application.

FIG. 1 illustrates diagrammatically a telephone system 10 employing apparatus and methods in accordance with the present invention. The specific application is shown in that figure as being one for an emergency "9-1-1" network.

In the overall system 10, a switching tandem 12 serves to relay an emergency call from a telephone company central office 14 servicing the particular station 16, of a plurality of stations which are geographically dispersed, which has initiated an emergency "9-1-1" call. The tandem 12 serves to relay the call from the appropriate telephone company central office 14 to a public safety answering point (PSAP) 18 which is primarily responsible for the geographic area encompassing central offices A–E 14, 14', 14'', 14''', 14'''' and all of the various stations services by those central offices.

FIG. 1 also illustrates peripheral PSAP's 20, 22 which are more geographically proximate, for example, a station 16 of origin, serviced by central office A 14, which has initiated an emergency call. It is a function of the present invention to specifically identify geographically, both as to any particular earth coordinate system and with respect to height above the surface of the earth, the station 16 initiating the call. The call can, thereby, be more appropriately responded to. That is, if there is a PSAP 20 which is more proximate the calling station 16 and has facilities for responding to the particular emergency, the call can be routed to that alternate PSAP 20 or those alternate PSAP's 20, 22. As will be able to be seen, therefore, knowing the precise location of the initiating call station 16 can become crucially important.

Figure 2:
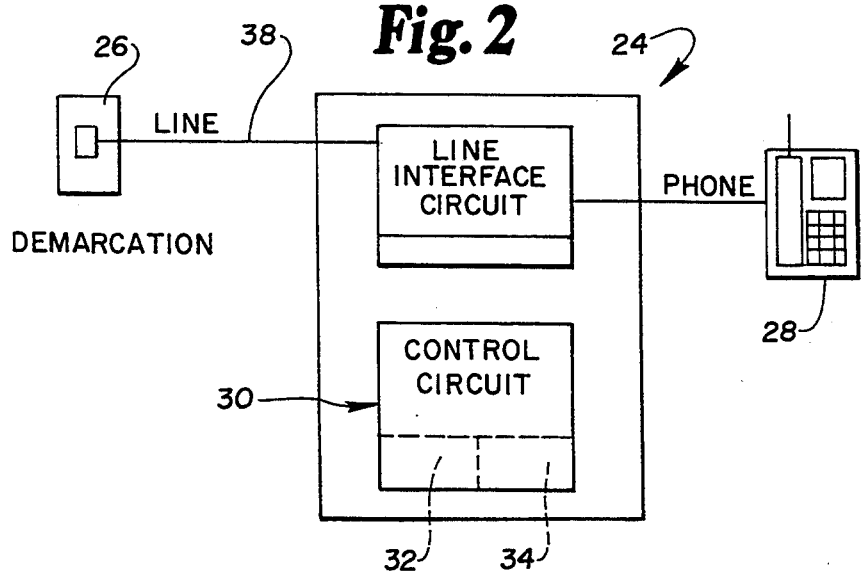
FIG. 2 is a schematic illustration showing the construction of the present invention.

FIG. 2 shows schematically the construction of a module 24 which has been installed, for example, at a wall outlet 26 demarcation point into which a jack of the phone set 28 of the calling station 16 serviced by central office A 14 is plugged. It will be understood that the demarcation point in other implementations as discussed hereinafter can be different. For example, the demarcation point can be at a private branch exchange (PBX) in an implementation wherein a PBX services off-premises extensions and/or branch offices.

At the time the module 24 is installed, the control circuit 30 of the module 24 is programmed with a specific designation to identify the specific station 16. The designation can, in rural areas, take the form of a fire number. Such a manner of designation, however, is not exclusive. Whether in rural, urban, or suburban environments, the designation can be completely arbitrary. For example, it could be the serial number of the module unit or it could be the next sequential number in a series of units having been installed. Typically, the designation would not be a telephone number. In any case, however, the designation is peculiar to the specific module 24 representative of the station to which it is connected.

The control circuit 30 further includes appropriate means for encoding 32 the designation into an electronic format. The control circuit 30 also includes a transmitter 34 for transmitting the electronic format encoded designation in a manner and for a purpose as will be discussed hereinafter.

When the station of origin 16 places a call by dialing "9-1-1", the telephone system 10 is alerted to the fact that the call is a call of an emergency nature. Typically, special trunks are reserved for such calls, and one of these trunks will be seized for use. The call is processed by the appropriate central office (in this case, central office A 14) and on to the switching tandem 12. Thereafter, it is relayed to the responsible PSAP 18.

In order to enable such transmission and relay, means 32 are provided in the control circuit 30 of the module 24, as previously discussed, to encode the designation into an electronic format for transmission. The encoded designation will be as unique as the designation itself.

The module 24, also as previously discussed, includes means for transmitting 34 the encoded designation in order to initiate the station identification process by the responsible PSAP 18. The emergency "9-1-1" call will be sensed at the PSAP 18, and the PSAP 18, in some cases, will, in turn, poll the transmitting means 34 of the module 24 by employment of appropriate polling means 36. It will be understood that polling is not the only manner in which the encoded designation transmission to the PSAP 18 is initiated. It can also be initiated by the module directly, subject to predefined conditions such as time delay, etc. In such a case, the PSAP 18 is disposed to receive the transmission of the encoded designation even where no active signal is sent back to the module 24.

Polling, as discussed above, is one mode of effecting the initiation of transmission of the encoded designation. In response to polling, the designation will be transmitted to the PSAP 18. The PSAP 18 having primary responsibility for the particular calling station 16 will then, either automatically or through the volitional act of PSAP personnel, identify the specific location of the station 16 having the designation which has been transmitted. In some applications of the invention, identification of the geographic location of the calling station 16 can be followed up with various routing procedures so as to effect provision of the necessary service or services to the calling station 16.

The module 24 utilizes a source of power. In some embodiments of the invention, the module 24 can be provided with its own discrete power source (not shown). Because of low power requirements of the module 24, however, power from the telephone line 38 can be employed.

Central office B 14' and the stations 40 that that central office 14' is shown as serving in FIG. 1 illustrate a second implementation of the invention. In that implementation, the telephone handsets represent all stations, including off-premises or branch offices, serviced by a common private branch exchange (PBX) 42. Again, however, each specific station 40 is provided, at a demarcation point, with a module 24 which is capable of functioning in the same manner as does the module 24 which is described as working with the station 16 which was serviced by central office A 14 in the previous illustration.

The central office C 14" implementation illustrates a module 24 as being provided to designate a particular PBX 44 and, derivatively, each station 46 serviced by the PBX 44. Typically, such an implementation would be used in a business environment having a plurality of stations including off-premises extensions or branch offices as is true in the case of central office B 14'. In this application, the specific calling station serviced by the PBX 44 would, in turn, be identified by use, for example, of a station translation system (not shown) such as that described and claimed in application Ser. No. 07/686,492, now U.S. Pat. No. 5,235,630, commonly owned by the assignee of the rights in the present document.

The present invention also has application in a CENTREX environment. CENTREX equipment is essentially a PBX within the telephone company system. In the case of a PBX which is owned by a private company serviced by the telephone system, a relatively small number of lines, typically, extend from the central office 14''' for servicing a large number of stations 48 associated with the PBX. In the case of a CENTREX system, the PBX, in essence, is associated with the applicable central office 14'''. There are then a large number of lines and a large number of stations 48. There is, basically, a one-to-one correspondence from the central office 14''' into a business.

In a CENTREX system, lines 50 from the telephone company come into a telephone company demarcation point 52 within a building, for example. The lines 50 are connected to terminals at the first demarcation point 52.

Lines 54 from the various spaces within the building, on the other hand, come into a second demarcation point 56 and are connected to terminals also. Various jumpers 58 can be employed for interconnecting the specific stations 48 with intended corresponding telephone company lines 50 coming into the first point of demarcation 52. Typically, when a building is first occupied, jumper interconnections 58 are uncomplicated and such that there is synchronization between the two points of demarcation 52, 56. As time passes and tenants within a building elect to move to another space while still keeping the same phone number, the jumpers 58 become crossed. As a result, when a particular station 48 within the building initiates an emergency "9-1-1" call, if the particular jumper 58 for that station has been crossed, an incorrect perception will be generated at the PSAP 18 as to the specific location of the calling station.

In the CENTREX implementation of the present invention, a module 24 is mounted for specific identification of a line extending from a specific station to the second point of demarcation 56. As a result, even if numbers and locations are changed, there will be a consistency because of the transmission of the designation provided by the calling station module 24.

A final illustration shown in FIG. 1 is an implementation representative, for example, of a party line. Included within this implementation is a situation wherein a second phone 62 is, for example, in a barn some distance remote from the primary station 60 serviced by a particular number (i.e., a farm house). In this implementation, the module 24 is typically mounted at a wall outlet. The designation generated by the module 24 is, therefore, representative of the specific handset which might initiate an emergency call.

It will be understood, in view of this disclosure, that the present invention has applications beyond an emergency "9-1-1" telephone call system. As previously discussed in this document, a need exists for the identification of the specific location from which a telephone call by a roving security guard is being made. The present invention applies to such circumstances.

Rather than the call-receiving office being a PSAP, it can be a monitoring office responsible for ensuring the visitation of the roving guard to each location for which he has a responsibility. The calling station at each location for which the guard has responsibility to visit would be equipped with a module as discussed with regard to an emergency "9-1-1" scenario. The monitoring station would receive calls from the various locations and would, employing appropriate polling means, poll the particular calling station in response to the call. The assigned designation would then be transmitted to the monitoring station in response to the polling. Personnel at the monitoring station could, thereby, ensure the physical presence of the roving security guard at the particular location from which he is purporting to call.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method of identifying a specific station of a plurality of stations initiating a "9-1-1" emergency telephone call, comprising the steps of:
    (a) permanently assigning a fixed designation to a geographically-defined station capable of initiating a "9-1-1" emergency telephone call;
    (b) encoding said designation into an electronic format;
    (c) providing means at the station for transmitting the encoded, fixed designation, to a public safety answering point (PSAP) responsible for a designated geographic area including the geographically-defined calling station;
    (d) sensing, at the responsible PSAP, a "9-1-1" emergency telephone call by the geographically-defined station;
    (e) polling the transmitting means in response to the "9-1-1" emergency call; and
    (f) transmitting the encoded, fixed designation to the responsible PSAP in response to said polling.

2. A method in accordance with claim 1 wherein the specific station initiating the "9-1-1" emergency telephone call is associated with a specific residence.

3. A method in accordance with claim 1 wherein the specific station initiating the "9-1-1" emergency telephone call is associated with a private branch exchange (PBX).

4. A method in accordance with claim 1 wherein the specific station initiating the "9-1-1" emergency telephone call is associated with a line connector board of a CENTREX telephone system.

5. A method in accordance with claim 1 further comprising a step of providing power to the transmitting means.

6. A method in accordance with claim 5 wherein the power provided to the transmitting means is telephone line power.

7. A method of routing emergency services to a specific station of a plurality of stations initiating a "9-1-1" emergency telephone call, comprising the steps of:
    (a) identifying the specific station having initiated the emergency telephone call in accordance with the method of claim 1, having previously ascertained if there is an available PSAP more geographically proximate the calling station than is the responsible PSAP; and
    (b) directing the encoded designation to the available PSAP most geographically proximate the calling station.

8. A method of identifying a specific station of a plurality of stations initiating a "9-1-1" emergency telephone call, comprising the steps of:
    (a) permanently assigning an arbitrary, fixed designation to a geographically-defined station capable of initiating a "9-1-1" emergency telephone call;
    (b) encoding said arbitrary, fixed designation into an electronic format;
    (c) sensing, at a public safety answering point (PSAP) responsible for a designated geographic area including the calling station, a "9-1-1" emergency telephone call;
    (d) polling, by the responsible PSAP, the calling station in response to the sensing of the "9-1-1" emergency telephone call; and
    (e) transmitting the encoded, fixed designation to the responsible PSAP in response to said polling.

9. A method in accordance with claim 8 comprising a further step of ascertaining, by computer-generation, the precise geographic location of the calling station.

10. A method of identifying a specific station of a plurality of geographically dispersed stations of a telephone system initiating a telephone call, comprising the steps of:
    (a) permanently assigning a fixed designation, based upon specific geographic location, to each station capable of initiating a telephone call within the system;
    (b) encoding said designation into an electronic format;
    (c) providing means at the calling station fore transmitting the encoded, fixed designation to a call-receiving office;
    (d) sensing, at the call-receiving office, the call by the calling station;
    (e) polling the transmitting means in response to the telephone call; and
    (f) transmitting the encoded, fixed designation to the call-receiving office in response to said polling.

11. A method in accordance with claim 10 further comprising a step of providing power to the transmitting means.

12. A method in accordance with claim 11 wherein the power provided to the transmitting means is telephone line power.

13. Apparatus for identifying one specific station, of a plurality of geographically-defined stations serviced by a telephone system, which has initiated a telephone call, comprising:
    (a) permanently, fixed designation indicia associated with each station capable of initiating a telephone call under the system;
    (b) means for encoding said designation indicia into an electronic format;
    (c) means, at each station, for transmitting said encoded, fixed designation indicia to a call-receiving location;
    (d) means for sensing, at the call-receiving location, the call by the calling station;
    (e) means for polling the transmitting means in response to the telephone call; and
    (f) means for transmitting the encoded, fixed designation indicia to the call-receiving location in response to said polling.

14. Apparatus in accordance with claim 13 wherein said call-receiving location is a monitoring office to which roving security guards report form various diverse geographic locations.

15. Apparatus in accordance with claim 13 wherein said call-receiving location is a public safety answering point (PSAP) responsible for a designated geographic area including the calling station.

16. A method of identifying a specific station of a plurality of stations initiating a telephone call, comprising the step of:
    (a) permanently assigning a fixed designation to a geographically-defined station capable of initiating a telephone call;

(b) encoding said designation into an electronic format;

(c) providing means at the station for transmitting the encoded, fixed designation to an answering point;

(d) sensing, at the answering point, the telephone call by the geographically-defined station;

(e) disposing the answering point to receive the encoded designation; and (f) transmitting the encoded, fixed designation to the answering point.

* * * * *